(12) United States Patent
Sun et al.

(10) Patent No.: US 10,197,064 B2
(45) Date of Patent: Feb. 5, 2019

(54) CENTRIFUGAL COMPRESSOR WITH FLUID INJECTOR DIFFUSER

(75) Inventors: Lin Sun, Tallahassee, FL (US); Joost Brasz, Fayetteville, NY (US)

(73) Assignee: DANFOSS A/S, Nordborg (DK)

( * ) Notice: Subject to any disclaimer, the term of this patent is extended or adjusted under 35 U.S.C. 154(b) by 713 days.

(21) Appl. No.: 13/642,240

(22) PCT Filed: Nov. 3, 2010

(86) PCT No.: PCT/US2010/055201
§ 371 (c)(1),
(2), (4) Date: Oct. 19, 2012

(87) PCT Pub. No.: WO2012/060825
PCT Pub. Date: May 10, 2012

(65) Prior Publication Data
US 2013/0036760 A1 Feb. 14, 2013

(51) Int. Cl.
*F04D 27/02* (2006.01)
*F01D 5/14* (2006.01)
(Continued)

(52) U.S. Cl.
CPC ......... *F04D 27/0238* (2013.01); *F01D 5/145* (2013.01); *F01D 17/08* (2013.01);
(Continued)

(58) Field of Classification Search
CPC .. F04D 29/5846; F04D 27/0207; F04D 29/44; F04D 29/441; F04D 29/46; F04D 29/462; F04D 29/464
(Continued)

(56) References Cited

U.S. PATENT DOCUMENTS 3,362,629 A * 1/1968 Papapanu ............. F04D 29/441
217/52
3,901,620 A 8/1975 Boyce
(Continued)

FOREIGN PATENT DOCUMENTS

EP 2169237 3/2010
JP S59696 1/1981

OTHER PUBLICATIONS

International Search Report for PCT Application No. PCT/US2010/055201, dated Dec. 29, 2010.
(Continued)

*Primary Examiner* — Kenneth J Hansen
(74) *Attorney, Agent, or Firm* — Carlson, Gaskey & Olds, P.C.

(57) ABSTRACT

A centrifugal compressor includes a housing providing in inlet, an impeller, a diffuser and a volute or collector. An electric motor is provided in the housing and is configured to drive at least one impeller via a shaft about an axis. The impeller includes an outlet end aligned with a diffuser and arranged at the throat. A variable fluid injector device is arranged downstream from the outlet end of the impeller in one example. The variable fluid injector device is configured to introduce high pressure fluid downstream from the impeller in response to a compressor regulation command. The injected fluid energizes the low momentum boundary layer, which provides compressor stability. A compressor controller is in communication with the variable fluid injection device to obtain a desired compressor operating condition.

18 Claims, 2 Drawing Sheets

(51) Int. Cl.
*F01D 17/08* (2006.01)
*F02C 3/32* (2006.01)
*F04D 29/44* (2006.01)
*F04D 29/58* (2006.01)
*F04D 29/68* (2006.01)

(52) U.S. Cl.
CPC .............. *F02C 3/32* (2013.01); *F04D 29/441* (2013.01); *F04D 29/5846* (2013.01); *F04D 29/681* (2013.01); *F04D 29/684* (2013.01); *F05D 2270/17* (2013.01)

(58) Field of Classification Search
USPC ......... 417/44.1, 42, 313; 415/116, 144, 145, 415/148, 150, 914; 62/228.4, 228.5, 468, 62/469, 505
See application file for complete search history.

(56) References Cited

U.S. PATENT DOCUMENTS

| | | | |
|---|---|---|---|
| 3,976,390 A | | 8/1976 | Silvern et al. |
| 4,094,613 A | | 6/1978 | Bracken |
| 4,579,509 A | * | 4/1986 | Jacobi ................... F01D 17/143 415/199.1 |
| 4,695,224 A | * | 9/1987 | Lown .................. F04D 29/5846 415/116 |
| 5,669,756 A | | 9/1997 | Brasz et al. |
| 5,807,071 A | | 9/1998 | Brasz et al. |
| 6,036,432 A | | 3/2000 | Sishtla et al. |
| 7,326,027 B1 | * | 2/2008 | Skoch et al. .................... 415/17 |
| 2005/0223737 A1 | * | 10/2005 | Conry ............................ 62/510 |
| 2009/0205360 A1 | * | 8/2009 | Haley et al. ..................... 62/498 |
| 2009/0205362 A1 | | 8/2009 | Haley |
| 2009/0229280 A1 | | 9/2009 | Doty et al. |

OTHER PUBLICATIONS

Kumar, et al., "Toward Understanding and Optimizing Separation Control Using Microjets," AIAA Journal, vol. 47, No. 11, Nov. 2009, pp. 2544-2557.

Kumar, et al., "Efficient Control of Separation Using Microjets," American Institute of Aeronautics and Astronautics, pp. 1-13.

Kumar, et al., "Active Control of Flow Separation Using Supersonic Microjets," Proceedings of FEDSM '03 4th ASME_JSME Joint Fluids Engineering Conference, Honolulu, Hawaii, Jul. 6-11, 2003, pp. 1-8.

Extended European Search Report for European Application No. EP 10859363 dated Nov. 4, 2014.

* cited by examiner

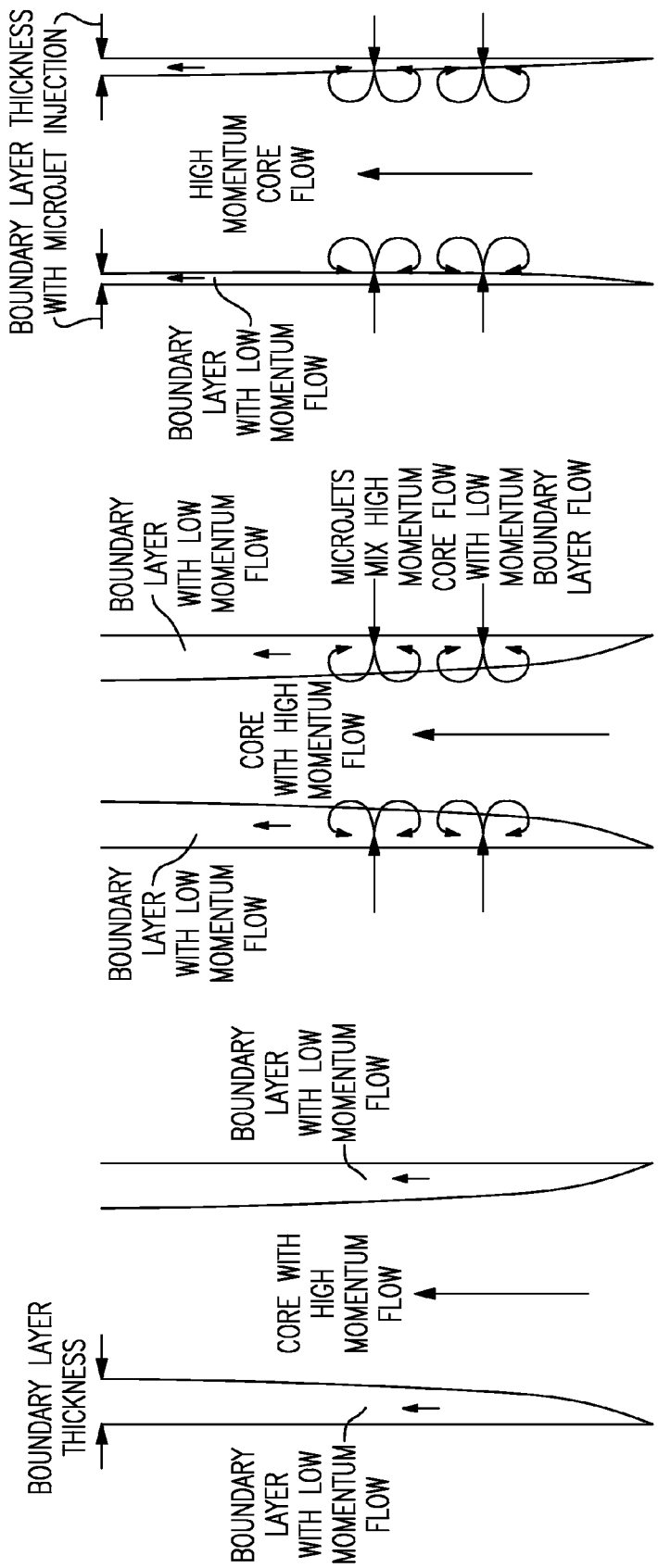

CENTRIFUGAL COMPRESSOR WITH FLUID INJECTOR DIFFUSER

BACKGROUND

This disclosure relates to a centrifugal compressor. More particularly, the disclosure relates to such a compressor having a diffuser with microjet fluid injection ports for increased stable operating range.

The main energy conversion elements of a centrifugal compressor are its impeller and diffuser. Inside the rotating impeller of the centrifugal compressor mechanical shaft energy is transferred into fluid energy. The fluid leaving the impeller has increased pressure and increased velocity. Roughly only half the energy transfer accomplished by the impeller is in the form of increased pressure (potential energy) while the remainder is in the form of high fluid velocity (kinetic energy). Since the purpose of a compressor is to increase pressure, centrifugal compressors are equipped with a diffusing element downstream of the impeller. In the diffuser high velocity kinetic energy is converted into potential energy increasing the overall pressure rise and therefore the overall efficiency of the compressor. The diffuser element downstream of the impeller can be either vaneless or vaned, depending on the specific requirements of the compressor.

At low-capacity off-design operating conditions the diffuser will be the element of the centrifugal compressor that causes flow instability preventing stable compressor operation. To increase the stable operating range of a centrifugal compressor at low flow conditions, variable geometry inlet guide vanes as well as variable geometry vaneless and vaned diffusers have been introduced. Variable geometry inlet guide vanes increase the stable operating range of a centrifugal compressor at lower flow rates through the increased throttling action at more closed guide vane positions. Variable geometry diffusers adjust the diffuser cross-sectional flow area to the low flow rate encountered under part-load conditions, thus maintaining flow angles and velocities similar to those at full-load design conditions.

Part-load stability has also been accomplished by recirculating discharge flow through the diffuser of the compressor. Instead of reducing the size of the diffuser to match the lower flow rate at part-load, increased stable operating range obtained by increasing the flow in the diffuser to full-load values through flow recirculation, again maintaining flow angles and velocities similar to those at full-load design conditions.

However, all variable geometry and recirculating flow concepts increase compressor cost and complexity considerably. These concepts are known to cause reliability issues and reduce centrifugal compressor efficiency at both design (due to increased leakages) and off-design conditions (due to full-load frictional losses at part-load flow conditions) considerably.

SUMMARY

A centrifugal compressor includes a housing providing in inlet, single or multiple impellers, a diffuser for every impeller and a volute or collector. An electric motor is provided in the housing and is configured to drive an impeller via a shaft about an axis. The impeller includes an outlet end aligned with a diffuser and arranged at the throat. A variable fluid injector device is arranged downstream from the outlet end of the impeller in one example. The variable fluid injector device is configured to introduce high pressure fluid downstream from the impeller in response to a compressor regulation command. The injected fluid energizes the low momentum boundary layer, which provides compressor stability. A compressor controller is in communication with the variable fluid injection device to obtain a desired compressor operating condition.

The disclosed centrifugal compressor extends stable operating range of a centrifugal compressor at low capacity by using microjets to energize the boundary layers. Boundary layer separation is the fundamental reason for diffuser flow instability in a centrifugal compressor at low flow conditions. The existing methods make mechanical adjustments through variable geometry features to maintain high flow conditions, increasing the stable operating range this way. The disclosed centrifugal compressor solves the boundary layers separation problem at low flow conditions by energizing the boundary layer through the injection of microjets. The cross-flow motion of these microjets energizes the low momentum boundary layers by mixing it with high momentum fluid particles of the diffuser core flow. The amount of fluid used to feed the microjets is negligible compared to the amount of fluid being used in the recirculating flow concept.

BRIEF DESCRIPTION OF THE DRAWINGS

The disclosure can be further understood by reference to the following detailed description when considered in connection with the accompanying drawings wherein:

FIGS. 3A-3C are schematic illustrations respectively of A) boundary layer thickness downstream from an impeller without a boundary layer control device, B) mixing action of high momentum core flow with low momentum boundary layer flow when microjets are activated, and C) resulting boundary layer thickness of the microjet boundary layer control device.

DETAILED DESCRIPTION

Figure 1:
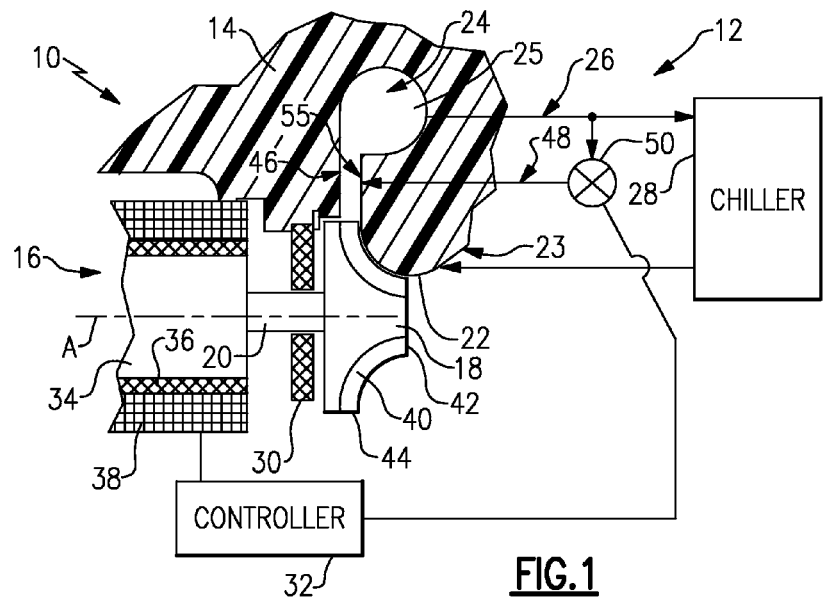
FIG. 1 is a highly schematic view of a refrigerant system having a refrigerant compressor with a magnetic bearing.
Figure 2:
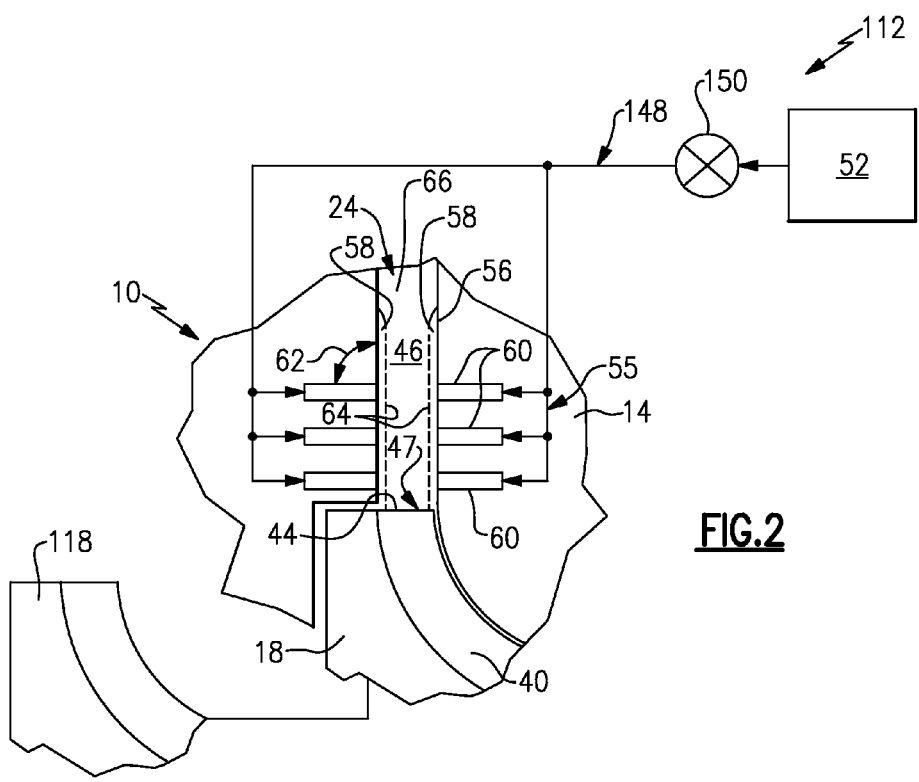
FIG. 2 is an enlarged, cross-sectional view of one example variable fluid injector arrangement.

Referring to FIG. 1, a refrigeration system 12 includes a refrigerant compressor 10 for circulating a refrigerant. A single stage compressor with only one impeller is shown in FIG. 1 for simplicity of description. A skilled worker will appreciate that this disclosure also can be used in multi-impeller arrangements. The compressor 10 includes a housing 14 within which an electric motor 16 is arranged. It should be understood that the compressor 10 can be used in non-refrigerant applications. The housing 14 is schematically depicted and may comprise one or more pieces. The electric motor 16 rotationally drives an impeller 18 via a shaft 20 about an axis A to pump a gas. A second impeller 118 is illustrated in FIG. 2, which may be arranged in series with the impeller 18, if desired.

The impeller 18 includes a gas inlet 22 and a gas outlet 24 in fluid communication with a gas loop 26 that circulates the refrigerant to a load, such as a chiller 28. In the example illustrated in FIG. 1, the compressor is provided by the impeller 18, which is centrifugal. That is, the inlet 22 is arranged axially, and the refrigerant outlet 24 is arranged radially. The gas loop 26 includes a condenser, an evaporator, and an expansion device (not shown).

An oil-free bearing arrangement is provided for support of the shaft 20 so that oil-free refrigerant can be used in the refrigerant compressor 10. In the example, the shaft 20 is rotationally supported relative to the housing 14 by a radial magnetic bearing assembly 30. The magnetic bearing assembly 30 may include radial and/or axial magnetic bearing elements, for example. A controller 32 communicates with the magnetic bearing assembly 30 providing a magnetic bearing command to energize the magnetic bearing assembly 30. The example controller 32 is schematically illustrated as a single controller 32; however, the controller may be provided by separate stand-alone units, if desired. The magnetic bearing assembly creates a magnetic field supporting the shaft 20 and controls its characteristics during operation of the compressor 10.

The electric motor 16 includes a rotor 34 supporting multiple magnets 36 about its circumference in one example. A stator 38 is arranged about the rotor 34 to impart rotational drive to the shaft 20 when energized. In one example, the controller 32 communicates with the stator 38 and provides a variable speed command to rotationally drive the impeller 18 at a variable speed depending upon compressor operating conditions.

The impeller 18 includes blades 40 that extend from an inlet end 42 generally radially outwardly along an arcuate path to an outlet end 44. The housing 14 includes an upstream region 23 at the inlet 22, which has typically contained variable inlet guide vanes in the prior art. The compressor 10 does not utilize variable inlet guide vanes at the upstream region 23 in the illustrated embodiment. Instead, a variable fluid injector device 55 is introduced downstream from the outlet end 44 to regulate the flow across the impeller 18.

The compressor outlet 24 includes a diffuser passage 46 having an inlet area 47 immediately adjacent to the impeller outlet end 44, as best illustrated in FIG. 2. The diffuser passage 46 extends to a volute 25, shown in FIG. 1. In the example shown, the variable fluid injector device 55 is provided at the diffuser inlet area 47 adjacent near the outlet end 44 of the impeller 18 and upstream from the volute 25. In one example, the passage 46 is without additional structures or vanes, providing a "vaneless" diffuser in a downstream region 66 between the variable fluid injector device 55 and the volute 25.

Referring to FIG. 1, one example configuration is illustrated for controlling the variable fluid injector device 55. The controller 32 is in communication with a flow control device 50 arranged in an injection loop 48 that is in fluid communication with the gas loop 26. In the example, the injection loop 48 receives high-pressure fluid from the gas loop 26. In the example shown in FIG. 1, the fluid in the injection loop 48 is primarily gas, although in other examples the fluid may be primarily liquid. For example, a fluid source 52 may provide liquid and/or gaseous fluid to the injection loop 148 through the flow control device 150. If, for example, fluid is provided from the inlet 22 to the passage 46, then a pump may be used as part of the flow control device 50 to deliver the desired amount of fluid for boundary layer control.

The controller 32 regulates the flow to the variable fluid injector device 55 by sending an impeller pressure regulation command to the flow control device 50, which may be commanded to a desired position corresponding to a desired injection flow rate. The controller 32 may reference various signals and determine the flow rate to the compressor discharge 26 and/or the pressure differential across the impeller 18 to command flow control device 50 and achieve desired compressor operation.

The variable fluid injector device 55 is shown in more detail in FIG. 2. The passage 46 is provided by a wall 56 having a surface 58. The variable fluid injector device 55 includes multiple injector nozzles 60 arranged in the surface 58 in a desired configuration based upon the designed flow characteristics of the compressor 10. The injector nozzles 60 are arranged at an angle 62 relative to the surface 58 to stabilize the boundary layer 64 along the surface 58, thereby obtaining a desired differential pressure across the compressor 10. The injected gas has a pressure greater than that of the compressed gas exiting the impeller outlet end 44. In the example shown, the injector nozzles 60 are arranged at an approximately 90 degree angle to the surface 58. The number, size, position and orientation of the injector nozzles 60 are selected based upon the application. The flow rates and pressures from the injector nozzles 60 are designed based on application.

When the controller 32 detects or anticipates a stall condition (e.g., during an unloading event), in particular during low flow conditions, the flow control device 50 is activated to introduce fluid to the passage 46 and increase the pressure in the downstream region 66. For example, fluid may be introduced to the passage 46 at 250 kPa differential pressure across the impeller 18 and a flow rate of 4 cfm. Increasing the flow rate from the injector nozzles 60 reduces the thickness of the boundary layer 64 thereby stabilizing the compressor flow. In stable conditions, the flow control device 50 may be closed such that no fluid is introduced to the passage 46.

Various boundary layer flows downstream from the impeller are schematically depicted in FIGS. 3A-3C to illustrate the effects of boundary layer control in the passage. FIG. 3A illustrates the increase in boundary layer thickness through the passage at compressor off-design conditions. The boundary layer is comparatively of a low momentum, which produces a relatively thick boundary layer. FIGS. 3B and 3C illustrate an arrangement in which fluid is injected into the passage downstream from the impeller. FIG. 3B illustrates injection of fluid into the passage carrying a low momentum flow. Due to the mixing action of the microjets (mixing high-momentum core flow with low-momentum boundary layer flow) the momentum of the boundary layer fluid increases. This reduces the boundary layer thickness (FIG. 3C), which improves the stability of the overall flow through the compressor.

Although an example embodiment has been disclosed, a worker of ordinary skill in this art would recognize that certain modifications would come within the scope of the claims. For that reason, the following claims should be studied to determine their true scope and content.

What is claimed is:

1. A centrifugal compressor comprising:
   a housing providing an inlet and an outlet having a vaneless diffuser and a volute;
   an electric motor provided in the housing and configured to drive at least one impeller via a shaft about an axis in response to a variable speed command, the impeller including an outlet end aligned with the vaneless diffuser;
   a variable fluid injector device downstream from the impeller outlet end and configured to inject fluid into the outlet in response to a compressor regulation command;
   a flow control device configured to control flow rate and pressure of injected fluid;
   a controller in communication with the electric motor and the variable fluid injector device, the controller configured to respectively provide the variable speed command and the compressor regulation command to the electric motor and operatively to the variable fluid injector device to obtain a desired compressor operating condition;

wherein the outlet includes a wall having a surface, the variable fluid injector device including multiple injector nozzles provided in the surface and oriented in a direction, the multiple injector nozzles configured to inject fluid into the vaneless diffuser such that fluid flows in the direction as fluid initially enters the vaneless diffuser, and wherein at least one of the multiple injector nozzles is radially spaced-apart, relative to the axis of rotation of the impeller, from at least one other of the multiple injector nozzles; and wherein the direction and an axis of rotation of the impeller are the same.

2. The centrifugal compressor according to claim 1, wherein the variable fluid injector device is arranged immediately adjacent to the outlet end of the impeller.

3. The centrifugal compressor according to claim 1, wherein the impeller is a centrifugal impeller with an axial inlet and the outlet end oriented radially.

4. The centrifugal compressor according to claim 3, wherein the housing provides a fluid inlet upstream from an inlet end of the impeller, the fluid inlet is provided without inlet guide vanes.

5. The centrifugal compressor according to claim 1, comprising a magnetic bearing assembly configured to control position of the shaft relative to the housing in response to a magnetic bearing command.

6. The centrifugal compressor according to claim 1, wherein the controller is configured to regulate a fluid flow rate to the injector nozzles to provide a desired boundary layer at the wall with the compressor regulation command.

7. The centrifugal compressor according to claim 1, wherein the multiple injector nozzles are arranged at a 90 degree angle relative to the surface.

8. The centrifugal compressor according to claim 1, wherein at least some of the multiple injector nozzles are provided on an opposite side of the outlet relative to at least some others of the multiple injector nozzles.

9. The centrifugal compressor according to claim 1, wherein the direction and the axis of rotation of the impeller are parallel.

10. The centrifugal compressor as recited in claim 1, wherein the multiple injector nozzles are configured to inject gas into the vaneless diffuser, and wherein the injected gas has a pressure greater than that of the fluid exiting the impeller.

11. A refrigeration system comprising:
a compressor housing providing an inlet and an outlet having a vaneless diffuser and a volute;
an electric motor provided in the housing and configured to directly drive at least one impeller via a shaft about an axis in response to a variable speed command, the impeller including an outlet end aligned with the vaneless diffuser;
a variable fluid injector device configured to inject refrigerant into the outlet in response to a compressor regulation command;
a controller in communication with the electric motor and the variable fluid injector device, the controller configured to respectively provide the variable speed command and the compressor regulation command to the electric motor and operatively to the variable fluid injector device to obtain a desired compressor operating condition;

a chiller in fluid communication with the impeller via a refrigerant loop;

wherein the outlet includes a wall having a surface, the variable fluid injector device including multiple injector nozzles provided in the surface and oriented in a direction;

wherein the direction and an axis of rotation of the impeller are the same; and wherein at least one of the multiple injector nozzles is radially spaced-apart, relative to the axis of rotation of the impeller, from at least one other of the multiple injector nozzles.

12. The refrigeration system according to claim 11, wherein the controller is configured to regulate a refrigerant flow rate to the injector nozzles to provide a desired boundary layer at the surface with the compressor regulation command.

13. The refrigeration system according to claim 11, wherein the impeller is a centrifugal impeller with an axial inlet and the outlet end oriented radially, the housing provides a refrigerant inlet upstream from an inlet end of the impeller, the refrigerant inlet is provided without inlet guide vanes.

14. The refrigeration system according to claim 11, wherein the multiple injector nozzles are arranged at a 90 degree angle relative to the surface.

15. The refrigeration system as recited in claim 11, wherein the multiple injector nozzles are configured to inject gas into the vaneless diffuser.

16. A centrifugal compressor comprising:
a housing providing an inlet and an outlet having a vaneless diffuser and a volute, and the housing provides an axial inlet upstream from an inlet end of an impeller, the axial inlet is provided without inlet guide vanes;
an electric motor provided in the housing and configured to drive at least one impeller via a shaft about an axis in response to a variable speed command, the impeller including an outlet end aligned with the vaneless diffuser, wherein the impeller is a centrifugal impeller with an axial inlet and the outlet end oriented radially;
a variable fluid injector device immediately adjacent to the impeller outlet end and upstream from the volute, and the variable fluid injector device configured to inject fluid into the outlet in response to a compressor regulation command;
a controller in communication with the electric motor and the variable fluid injector device, the controller configured to respectively provide the variable speed command and the compressor regulation command to the electric motor and operatively to the variable fluid injector device to obtain a desired compressor operating condition;
wherein the outlet includes a wall having a surface, the variable fluid injector device including multiple injector nozzles provided in the surface and oriented in a direction, the multiple injector nozzles configured to inject fluid into the vaneless diffuser such that fluid flows in the direction as fluid initially enters the vaneless diffuser;
wherein the direction and an axis of rotation of the impeller are the same;
wherein at least one of the multiple injector nozzles is radially spaced-apart, relative to the axis of rotation of the impeller, from at least one other of the multiple injector nozzles; and
wherein the multiple injector nozzles are configured to inject gas into the vaneless diffuser.

17. The centrifugal compressor according to claim 16, wherein the multiple injector nozzles are arranged at a 90 degree angle relative to the surface.

18. The centrifugal compressor as recited in claim 16, wherein the injected gas has a pressure greater than that of the fluid exiting the impeller.

* * * * *